(12) United States Patent
Konishi et al.

(10) Patent No.: US 12,490,760 B2
(45) Date of Patent: Dec. 9, 2025

(54) COMPOUND AND FLAVOR-IMPARTING COMPOSITION USING SAME

(71) Applicant: T. HASEGAWA CO., LTD., Tokyo (JP)

(72) Inventors: Shunsuke Konishi, Tokyo (JP); Tadashi Yoshimoto, Tokyo (JP); Shunsuke Takishima, Tokyo (JP); Takaharu Sawamura, Tokyo (JP)

(73) Assignee: T. HASEGAWA CO., LTD., Tokyo (JP)

(*) Notice: Subject to any disclaimer, the term of this patent is extended or adjusted under 35 U.S.C. 154(b) by 945 days.

(21) Appl. No.: 17/654,310

(22) Filed: Mar. 10, 2022

(65) Prior Publication Data

US 2022/0295845 A1    Sep. 22, 2022

(30) Foreign Application Priority Data

Mar. 19, 2021  (JP) ................ 2021-045440

(51) Int. Cl.
| | |
|---|---|
| *A23L 27/20* | (2016.01) |
| *A23C 9/13* | (2006.01) |
| *A23F 3/40* | (2006.01) |
| *A23G 9/42* | (2006.01) |
| *A23L 2/56* | (2006.01) |
| *A23L 21/12* | (2016.01) |

(52) U.S. Cl.
CPC ........ *A23L 27/2024* (2016.08); *A23C 9/1307* (2013.01); *A23F 3/405* (2013.01); *A23G 9/42* (2013.01); *A23L 2/56* (2013.01); *A23L 21/12* (2016.08); *A23V 2002/00* (2013.01)

(58) Field of Classification Search
CPC ........ A23L 27/2024; A23L 2/56; A23L 21/12; A23C 9/1307; A23F 3/405; A23G 9/42; A23G 9/32; A23V 2002/00; C12G 3/06; C11B 9/0015; A61K 8/35; A61K 2800/10; A61Q 19/00
See application file for complete search history.

(56) References Cited

U.S. PATENT DOCUMENTS

| | | | | | |
|---|---|---|---|---|---|
| 4,226,892 | A | * | 10/1980 | Kovats | A23L 27/203 426/538 |
| 7,176,177 | B2 | * | 2/2007 | Lambrecht | A23L 27/2024 426/534 |
| 2001/0005711 | A1 | * | 6/2001 | Lambrecht | C11B 9/0015 512/26 |

FOREIGN PATENT DOCUMENTS

| | | | | |
|---|---|---|---|---|
| DE | 2022216 A1 | * | 11/1970 | ........... A23L 27/203 |
| JP | 2004-168936 A | | 6/2004 | |
| SG | 192194 A1 | * | 9/2013 | ............... A23L 2/56 |

OTHER PUBLICATIONS

Weyerstahl, P.; Christiansen, C.; Marschall, H., "Constituents of Brazilian Vassoura Oil", Flavour and Fragrance Journal, 11, 15-23, 1996. (Year: 1996).*
Sturtz, G., "Application of B-oxophosphonates to the synthesis of α-ethylenic ketones and alkyl cyclopropyl ketones", Bulletin de la Societe Chimique de France, 9, 2349-2357, 1964. (Year: 1964).*
Di Mola, A. et al. Effect of citral and citral related compounds on viability of pancreatic and human B-lymphoma cell lines. Med Chem Res 2017, 26, 631-639. (Year: 2017).*
Exo-isocitral. The Good Scents Company, Nov. 5, 2017. https://www.thegoodscentscompany.com/data/rw1377081.html (Year: 2017).*
Sturtz, G. Bulletin de la Societe Chimique de France 1964, 9, 2349-2357 (Year: 1964).*
U.S. Appl. No. 17/654,310. Applicant Arguments/Remarks Made in an Amendment. Filed on Jul. 11, 2025. (Year: 2025).*
6820-02-6 STN http://www.stn.org, 1 page (Nov. 16, 1984).
Office Action dated Oct. 27, 2023 for corresponding Chinese Patent Application No. 202210215727.6, with English translation.
Second Examination Opinion Notice, dated Jul. 15, 2024, for the corresponding Chinese Patent Application No. 202210215727.6, with English Translation.

* cited by examiner

*Primary Examiner* — Jeffrey H Murray
*Assistant Examiner* — Kristen W Romero
(74) *Attorney, Agent, or Firm* — LUCAS & MERCANTI, LLP

(57) ABSTRACT

Provided are: a compound represented by the following formula (1); a flavor-imparting composition including the compound; a consumer product containing the flavor-imparting composition; a method of imparting a flavor to an flavor-imparting composition, the method including a step of adding the flavor-imparting composition to an flavor-imparting composition; and a method of imparting a flavor to a consumer product, the method including a step of adding the flavor-imparting composition to a consumer product.

(1)

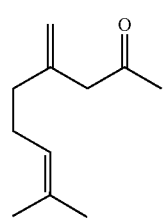

8 Claims, No Drawings

COMPOUND AND FLAVOR-IMPARTING COMPOSITION USING SAME

CROSS-REFERENCE TO RELATED APPLICATION

Japanese Patent Application No. 2021-045440, filed on Mar. 19, 2021, including Description, Claims, and Abstract is entirely incorporated herein by reference.

TECHNICAL FIELD

The present invention relates to a novel compound, a flavor-imparting composition and a consumer product, and a method of imparting a flavor to a flavor-imparting composition and a method of imparting a flavor to a consumer product.

BACKGROUND ART

In recent years, demands of consumers for various products including foods, beverages, perfumery, cosmetics, pharmaceuticals, and health and sanitary products (hereinafter, which may be referred to as consumer products) have been widened on aromas of the consumer products. Various aromas rich in natural feeling have been required due to rise in the preference of consumers for naturalness, but only conventionally proposed aroma compounds cannot sufficiently comply with the requirement. Therefore, development of versatile flavor-imparting compositions that can impart an unprecedented character is desired.

Among them, consumer products having a citrus note (hereinafter, which may be referred to as citrus consumer products) are highly preferred, and development of flavor-imparting compositions usable for the citrus consumer products is important. As an example of the flavor-imparting composition for the citrus consumer product, Japanese Patent Laid-Open No. 2004-168936 discloses that citral can be used as an aroma-flavor imparting or modifying agent of a citrus-like aroma composition.

SUMMARY OF INVENTION

However, citral, which is described in Japanese Patent Laid-Open No. 2004-168936, is extremely unstable under various conditions, and is an α, β-unsaturated aldehyde with a high reactivity. In addition, since it has another unsaturated bond in the molecule, an intramolecular addition reaction occurs to generate an isomerized product having a low boiling point. Furthermore, this isomerized product as a precursor generates a causative substance of a deterioration odor. The causative substance also has a problem of a low threshold. Thus, development of a novel citral-alternative compound, and development of a novel flavor-imparting composition and a consumer product using the citral-alternative compound have been expected.

Accordingly, an object of the present invention is to provide a novel compound, a flavor-imparting composition and a consumer product, and a method of imparting a flavor to a flavor-imparting composition and a method of imparting a flavor to a consumer product.

The present inventors conducted intensive studies to solve the above problem. As a result, the present inventors have found that a novel compound described below is excellent as the citral-alternative compound and has an excellent effect of imparting a flavor. The present inventors have found that at least one of the above problems can be solved by the novel compound described below, and have completed the invention according to the present application.

A summary of representative embodiments of the invention disclosed in the present application will be briefly described as follows.

To achieve at least one of the above objects, a compound reflecting one aspect of the present invention is represented by the following formula (1).

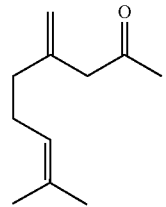

(1)

DESCRIPTION OF EMBODIMENTS

Embodiments of the present invention will be described below in detail. The present invention is not limited only to the following embodiments. In the present description, operations, and measurements of physical properties and the like are conducted under conditions of room temperature (20° C. or higher and 25° C. or lower)/a relative humidity of 40% RH or higher and 50% RH or lower, unless otherwise specified. In the present description, the term "x to y" indicating a range means a range including the lower limit (x) and the upper limit (y). In the present description, the term "X and/or Y" means including at least one of X and Y, and includes "X alone," "Y alone," and "combination of X and Y." In the present description, the term "concentration (ppm, ppb or ppt)" represents "mass concentration," and "%" represents "mass percent concentration," unless otherwise specified. In the present description, the term "flavor" means one or more sensations that may change with aroma (scent), the sensations representatively including olfaction and/or gustation. In the present description, the term "flavor-imparting (imparting a flavor)" includes newly adding a flavor and/or enhancing a flavor, and also includes improving a flavor as a result of imparting or enhancing a flavor. The term "flavor-imparting (imparting a flavor)" further includes enhancing, suppressing or improving a sensation other than olfaction and/or gustation, which is, for example, cooling sensation, warming sensation, texturing sensation (such as throat-passing feel, hardness and viscosity, which is also referred to as texture), or stimulating sensations by carbonation, pungency or the like, as a result of imparting a flavor. In the present description, flavors of foods and beverages may be referred to as tastes. In the present description, "adding" or "addition" includes at least one of simple addition to a certain target by spraying, dropping or the like and mixing with a certain target.

The present invention can provide a novel compound, a flavor-imparting composition and a consumer product, and a method of imparting a flavor to a flavor-imparting composition and a method of imparting a flavor to a consumer product.

(Compound)

A compound according to one embodiment of the present invention (hereinafter, which may be referred to as the present compound) is a compound represented by the following formula (1) (8-methyl-4-methylenenona-7-en-2-one).

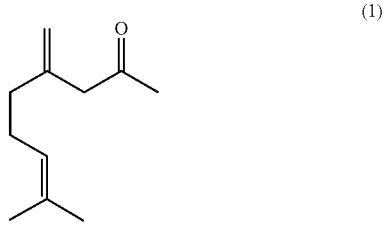

Means for obtaining the compound of the formula (1) is not particularly limited, and for example, the compound can be obtained by one of two procedures, <Reaction route A> and <Reaction route B>, described below. That is, the present invention also provides, as another embodiment, a method of producing the compound of the formula (1) by <Reaction route A> or <Reaction route B> described below.

<Reaction Route A>

A double bond in geranic acid or a geranate ester (a compound represented by the formula (2)) is isomerized to the exo-side by using a strongly basic compound (strong base) such as lithium diisopropylamide (LDA) and sodium hydride (NaH) to obtain a compound represented by the formula (3). Then, the compound represented by the formula (3) is converted into a morpholine amide (a compound represented by the formula (4)) by amidation. This morpholine amide (the compound represented by the formula (4)) is methylated to obtain the target compound of the formula (1).

<Reaction Route B>

Geranic acid or a geranate ester (the compound represented by the formula (2)) is converted into a morpholine amide (a compound represented by the formula (6)) by amidation. Then, a double bond in this morpholine amide (the compound represented by the formula (6)) is isomerized to the exo-side using a strongly basic compound (strong base) such as lithium diisopropylamide (LDA) to be converted into the morpholine amide represented by the formula (4). This morpholine amide (the compound represented by the formula (4)) is methylated to obtain the target compound of the formula (1).

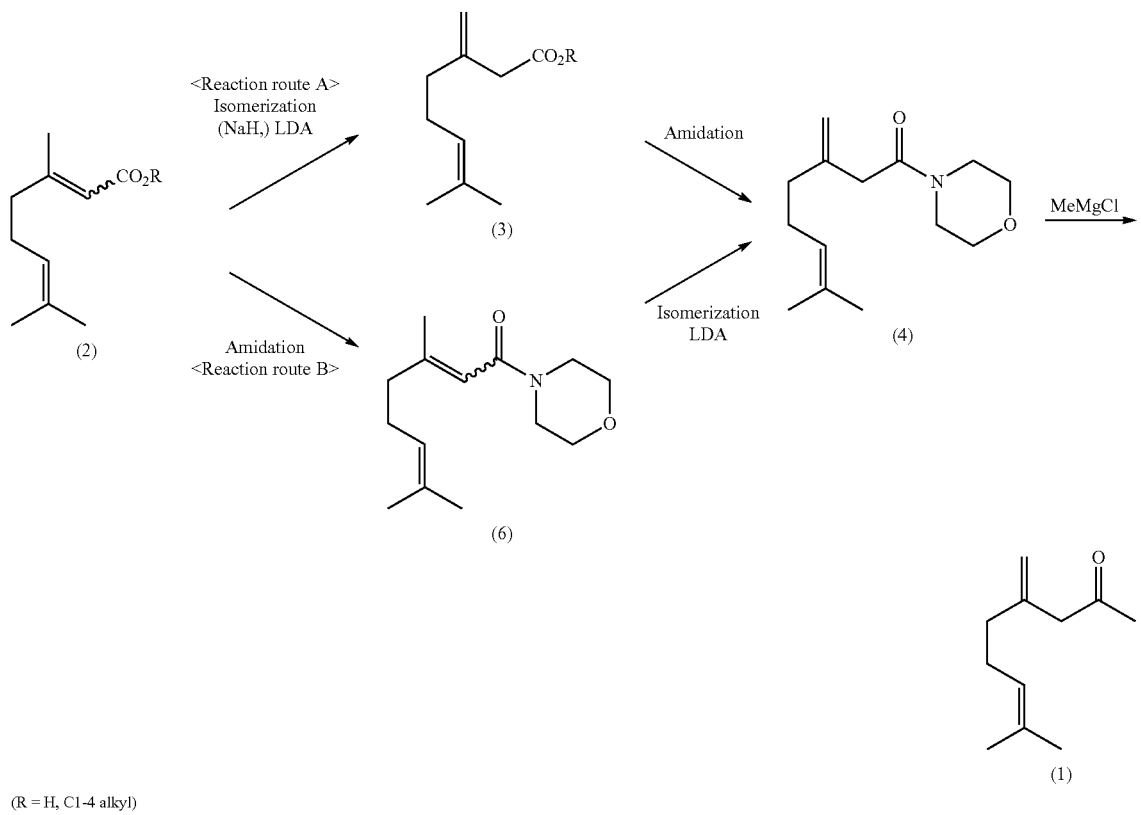

(R = H, C1-4 alkyl)

In the formulas (2) and (3), R represents, for example, a hydrogen atom, or a linear or branched alkyl group having 1 to 8 carbon atoms, and R is preferably a hydrogen atom, or a linear or branched alkyl group having 1 to 4 carbon atoms (the above scheme describes this example). Examples of the linear or branched alkyl group having 1 to 4 carbon atoms include a methyl group, an ethyl group, a n-propyl group, an isopropyl group, a n-butyl group, a sec-butyl group, an isobutyl group and a tert-butyl group.

In <Reaction route A> and <Reaction route B>, a methylation method is not particularly limited, but preferably performed with a Grignard reagent.

The present compound obtained by the above synthetic procedure may be further purified, if necessary, by using column chromatography or means for distilling purification such as distillation under reduced pressure. Preferable embodiments of purifying the present compound include distilling purification after the methylation of the morpholine amide (the compound represented by the formula (4)).

The reaction conditions in <Reaction route A> and <Reaction route B>, purification conditions and the like can be appropriately designed by those skilled in the art.

The present inventors have confirmed that the present compound has characteristic aromas including a citrus aroma, and that the characteristic aromas have almost the same aroma as citral, as described below in Example 2. The present inventors have also confirmed that the present compound has a detecting threshold concentration being the same level as that of citral. Furthermore, the present inventors have confirmed that the present compound is more stable than citral under various conditions, as described below in Example 3. Therefore, the present compound is considered to be remarkably useful as the citral-alternative compound.

(Flavor-Imparting Composition)

A flavor-imparting composition according to one embodiment of the present invention (hereinafter, which may be referred to as the present flavor-imparting composition) contains the present compound. That is, the present invention also provides a flavor-imparting composition including the compound of the formula (1) as another embodiment. In addition, another embodiment of the present invention provides an application of the compound of the formula (1) as a flavor-imparting composition.

The present inventors have found that the present flavor-imparting composition including the present compound has an excellent effect of imparting a flavor by addition to various products, as shown in an example described below in Examples. More specifically, it has been found that the present flavor-imparting composition can impart not only a citrus sense but also a fresh top-note or peel feeling, a tasty feeling (spread) based thereon, and the like to various products as an adding target. Thus, examples of the flavor imparted by the present flavor-imparting composition preferably include a citrus flavor.

The present flavor-imparting composition may be composed of only the present compound, or may include other components (a solvent and other additives such as another aroma component) in addition to the present compound. Specific examples of the aroma component as the other additives and specific examples of the solvent include those described in the following section of "Aroma composition."

For example, when the present flavor-imparting composition includes a solvent and/or another aroma component as a component (s) other than the present compound, the present flavor-imparting composition itself may be used as the aroma composition. A concentration of the present compound in the flavor-imparting composition may be appropriately determined according to an adding target and aroma properties of the flavor-imparting composition.

The product as the adding target of the present flavor-imparting composition is not particularly limited, and examples thereof include other flavor-imparting compositions or consumer products (such as foods, beverages, perfumery, cosmetics, pharmaceuticals, and health and sanitary products). As described below in detail, preferable consumer products to which the present compound or the present flavor-imparting composition is added include foods, beverages, perfumery and cosmetics. Thus, preferable embodiments of the present flavor-imparting composition include a flavor-imparting composition for foods or beverages and flavor-imparting composition for perfumery or cosmetics that include the compound of the formula (1). As another preferable embodiment of the present invention, provided is an application of the compound of the formula (1) as a flavor-imparting composition for foods and beverages or a flavor-imparting composition for perfumery and cosmetics.

Furthermore, the present flavor-imparting composition can impart a flavor to various aroma compositions to improve a flavor of the aroma composition by addition to the aroma composition as an example of the other flavor-imparting composition. It has been confirmed that adding the present flavor-imparting composition to various aroma compositions can impart not only a citrus sense but also a fresh top-note or peel feeling, a tasty feeling (spread) based thereon, and the like, as described below in Examples.

It has also been confirmed that adding the present flavor-imparting composition to various consumer products can impart not only a citrus sense but also a fresh top-note or peel feeling and tasty feeling (spread) based thereon, as described below in Examples.

A concentration (a content) of the present compound in the present flavor-imparting composition may be appropriately determined according to an adding target of the flavor-imparting composition. Examples of the concentration (the content) of the present compound include a range of 100 ppb to 100%, preferably 1 ppm to 10%, more preferably 5 ppm to 5%, and particularly preferably 10 ppm to 1%, relative to a total mass of the flavor-imparting composition. More specifically, the lower limit is set to any one of 100 ppb, 1 ppm, 5 ppm, 10 ppm, 100 ppm, 0.1%, 1%, 5% and 10%, the upper limit is set to any one of 100%, 10%, 5%, 1%, 0.1%, 100 ppm, 10 ppm, 5 ppm and 1 ppm, and the concentration (the content) may be within a range of any combination of these lower limit and upper limit, but the concentration is not limited thereto.

(Aroma Composition)

An aroma composition according to one embodiment of the present invention (hereinafter, which may be referred to as the present aroma composition), which is one aspect of the present flavor-imparting composition, contains the present compound, and may be added to various products in order to impart an aroma. That is, the present invention also provides an aroma composition including the compound of the formula (1) as another embodiment. Another embodiment of the present invention provides an application of the compound of the formula (1) as an aroma composition. Furthermore, provided as another preferable embodiment is an application of the compound of the formula (1) as an aroma composition for foods and beverages or an aroma composition for perfumery and cosmetics. The present aroma composition can impart a flavor to various products by addition to the product. More specifically, the present aroma composition can impart a fresh top-note or peel feeling, a tasty feeling (spread) based thereon, and the like to various products as an adding target. Specific examples of the present aroma composition include aroma compositions for foods and beverages (also referred to as flavor compositions) and aroma compositions for perfumery and cosmetics (also referred to as fragrance compositions). Examples of the product to be the adding target include, as above, consumer products such as foods, beverages, perfumery, cosmetics, pharmaceuticals, and health and sanitary products. A form of the present aroma composition is not particularly limited, and examples thereof include water-soluble aroma compositions, oil-soluble aroma compositions, emulsified aroma compositions and powdered aroma compositions.

A concentration (a content) of the present compound in the aroma composition may be appropriately determined according to an adding target of the aroma composition, and an amount of the present compound to be added may be regulated based on the concentration of the present compound, which is an active component, similar to the above present flavor-imparting composition. Examples of the concentration (the content) of the present compound include a range of 100 ppb to 10%, preferably 1 ppm to 1%, more preferably 10 ppm to 0.1%, and particularly preferably 50 ppm to 500 ppm (0.05%), relative to a total mass of the aroma composition. More specifically, the lower limit is set to any one of 100 ppb, 1 ppm, 10 ppm, 50 ppm, 100 ppm, 500 ppm, 0.1% and 1%, the upper limit is set to any one of 10%, 1%, 0.1%, 500 ppm, 100 ppm, 50 ppm, 10 ppm and 1 ppm, and the concentration (the content) may be within a range of any combination of these lower limit and upper limit, but the concentration is not limited thereto. Although depending on a formulation and note of the aroma composition, the concentration (the content) of the present compound in the aroma composition is preferably set to 100 ppb to 10% or further within the preferable range described above because the adding effect can be felt and the scent derived from the present compound is not excessively prominent. It is to be noted that the present compound may be added at a lower concentration than the lower limit or at a higher concentration than the upper limit according to notes of the aroma composition of the adding target.

The present aroma composition may further contain another optional compound or component (another additive) in addition to the present compound.

Examples of such compounds or components include various types of aroma compounds or aroma compositions, oil-soluble pigments, vitamins, functional substances, fish meat extracts, meat extracts, plant extracts, yeast extracts, animal and plant proteins, animal and plant protein degradation products, starch, dextrin, saccharides, amino acids, nucleic acids, organic acids, and solvents. Examples thereof include natural essential oils, natural aroma chemicals and synthetic aroma chemicals described in "Collection of Well-known Prior Arts (Perfume) Section II Perfumes for Foods, published by Japan Patent Office on Jan. 14, 2000," "Poundage surveys of flavoring substances used in Japan" (Health Science Search Report in 2000, Japan Flavor & Fragrance Materials Association, published in March, 2001), and "Gosei Koryo: Kagaku to Shohin Chishiki (Synthetic Perfumes: Chemistry and Merchandise Knowledge)" (enlarged new edition published on Dec. 20, 2016, edited by Synthetic Perfumes Editing Committee, published by The Chemical Daily Co., Ltd.).

As specific examples of the synthetic aroma chemical compound, examples of hydrocarbon compounds include: monoterpenes such as α-pinene, β-pinene, γ-terpinene, myrcene, camphene, limonene and nerol; sesquiterpenes such as valencene, cedrene, caryophyllene, longifolene and β-sinensal; and 1,3,5-undecatriene.

Examples of alcohol compounds include: saturated alcohols such as butanol, pentanol, isoamyl alcohol, 3-octanol and hexanol; unsaturated alcohols such as (Z)-3-hexen-1-ol (cis-3-hexenol), prenol and 2,6-nonadienol; terpene alcohols such as linalool, geraniol, citronellol, tetrahydromyrcenol, farnesol, nerolidol, cedrol, α-terpineol, β-terpineol, γ-terpineol, δ-terpineol, terpine-4-ol and borneol; and aromatic alcohols such as benzyl alcohol, phenylethyl alcohol and cinnamyl alcohol.

Examples of aldehyde compounds include: saturated aldehydes such as acetaldehyde, hexanal, octanal and decanal; unsaturated aldehydes such as (E)-2-hexanal and 2,4-octadienal; terpene aldehydes such as citronellal, hydroxycitronellal, citral, myrtenal and perillaldehyde; and aromatic aldehydes such as benzaldehyde, cinnamaldehyde, vanillin, ethylvanillin, heliotropine and p-tolylaldehyde.

Examples of ketone compounds include: saturated and unsaturated ketones such as 2-heptanone, 2-undecanone, 1-octen-3-one, acetoin and 6-methyl-5-hepten-2-one (methylheptenone); diketones and hydroxyketones such as diacetyl, 2,3-pentanedione, maltol, ethylmaltol, cyclotene and 2,5-dimethyl-4-hydroxy-3 (2H)-furanone; terpene ketones such as carvone, menthone and nootkatone; ketones derived from terpene degradation products such as α-ionone, β-ionone and β-damascenone; and aromatic ketones such as raspberry ketone.

Examples of furan or ether compounds include furfuryl alcohol, furfural, rose oxide, linalool oxide, menthofuran, theaspirane, estragole, eugenol and 1,8-cineol.

Examples of ester compounds include: aliphatic esters such as ethyl acetate, amyl acetate, isoamyl acetate, octyl acetate, ethyl propionate, ethyl butyrate, ethyl isobutyrate, amyl butyrate, isoamyl butyrate, ethyl 2-methylbutyrate, amyl valerate, isoamyl valerate, ethyl isovalerate, 2-methylbutyl isobutyrate, citronellyl isobutyrate, ethyl hexanoate (ethyl caproate), allyl hexanoate (allyl caproate), isoamyl hexanoate (isoamyl caproate), ethyl heptanoate, ethyl octanoate (ethyl caprylate), isoamyl isovalerate, ethyl nonanoate, ethyl decanoate (ethyl caprate) and diethyl malonate; terpene alcohol esters such as linalyl acetate, geranyl acetate, lavandulyl acetate, terpinyl acetate and neryl acetate; and aromatic esters such as benzyl acetate, methyl salicylate, methyl cinnamate, cinnamyl propionate, ethyl benzoate, 2-pheynlethyl isobutyrate, cinnamyl isovalerate, terpinyl isovalerate and ethyl 3-methyl-2-phenylglycidate.

Examples of lactone compounds include: saturated lactones such as γ-decalactone, γ-dodecalactone, γ-undecalactone, δ-decalactone and δ-dodecalactone; and unsaturated lactones such as 7-decen-4-oldie and 2-decen-5-olide.

Examples of acid compounds include saturated or unsaturated aliphatic acids such as acetic acid, butyric acid, isobutyric acid, isovaleric acid, hexanoic acid, octanoic acid, stearic acid, oleic acid, linoleic acid and linolenic acid.

Examples of nitrogen-containing compounds include indole, skatole, pyridine, alkyl-substituted pyrazines, methyl anthranilate and trimethylpyrazine.

Examples of sulfur-containing compounds include methanethiol, dimethyl sulfide, dimethyl disulfide, allyl isothiocyanate, 3-methyl-2-butene-1-thiol, 3-methyl-2-butanetiol, 3-methyl-1-butanetiol, 2-methyl-1-butanethiol, 3-mercaptohexanol, 4-mercapto-4-methyl-2-pentanone, 3-mercaptohexyl acetate, p-mentha-8-thiol-3-one and furfuryl mercaptan.

Examples of natural essential oils include sweet orange, bitter orange, petitgrain, lemon, lime, bergamot, mandarin, neroli, peppermint, spearmint, lavender, chamomile, rosemary, eucalyptus, sage, basil, rose, hyacinth, lilac, geranium, jasmine, ylangylang, anise, clove, ginger, nutmeg, cardamom, cypress, Japanese cypress, vetiver, patchouli and labdanum.

Examples of various animal and plant extracts include: extracts from herbs or spices (such as gingers, Japanese peppers and capsicums); extracts from fruits (such as oranges, lemons, limes, yuzus, strawberries and peaches) or vegetables; extracts from coffee, green tea, black tea or oolong tea; and milk or milk-processed product and various enzyme degradation products thereof with lipase, protease or the like.

The present aroma composition may be prepared by adding the present compound or the present flavor-imparting composition to an appropriate solvent or dispersion medium by a known method.

A form of the present aroma composition is preferably a solution in which the present compound or the present flavor-imparting composition and another component added as needed (another additive), are dissolved in a water-soluble or an oil-soluble solvent, an emulsified preparation, a powdered preparation, or another solid preparation (such as solid fat).

Examples of the water-soluble solvents include ethanol, methanol, acetone, tetrahydrofuran, acetonitrile, 2-propanol, methyl ethyl ketone, glycerin, propylene glycol and dipropylene glycol. Among them, the solvent (water-soluble solvent) included in the aroma composition preferably includes at least one selected from the group consisting of ethanol, glycerin and propylene glycol, and is particularly preferably ethanol or glycerin, from the viewpoint of the use for foods and beverages.

Examples of the oil-soluble solvents include vegetable fats and oils, animal fats and oils, purified fats and oils (for example, processed fats and oils such as middle-chain fatty acid triglycerides and short-chain fatty acid triglycerides such as triacetin and tripropionin), various essential oils and triethyl citrate.

The emulsified preparation can be obtained by emulsifying the present compound or the present flavor-imparting composition with the water-soluble solvent and an emulsifier. An emulsifying method of the present compound and the present flavor-imparting composition is not particularly limited, and examples thereof include an emulsifying treatment using various types of emulsifiers conventionally used for foods and beverages or the like, for example, a fatty acid monoglyceride, a fatty acid diglyceride, a fatty acid triglyceride, propylene glycol fatty acid ester, a sucrose fatty acid ester, a polyglycerin fatty acid ester, lecithin, modified starch, sorbitan fatty acid ester, quillaja extract, gum arabic, tragacanth gum, guar gum, karaya gum, xanthan gum, pectin, alginic acid and salts thereof, carrageenan, gelatin, casein quillaja saponin, or sodium caseinate, and using a mixing means such as a homo-mixer, a colloid mil, a rotary-disk homogenizer and a high-pressure homogenizer. Such an emulsifying method can yield an excellently stable emulsion liquid. An amount of these emulsifiers to be used is not strictly limited, and can be changed in a wide range according to a type of the emulsifier used and the like. An appropriate amount thereof is typically within a range of approximately 0.01 to approximately 100 parts by mass, and preferably approximately 0.1 to approximately 50 parts by mass, relative to 1 part by mass of the present compound. To stabilize the emulsion state, one or a mixture of two or more polyalcohols such as, for example, glycerin, propylene glycol, sorbitol, maltitol, sucrose, glucose, trehalose, molasses and reduced millet jelly may be added to the above emulsion liquid in addition to water.

The above obtained emulsion liquid can be dried, if necessary, to form the powdered preparation. With the powderization, saccharides such as gum arabic, trehalose, dextrin, sugar, lactose, glucose, millet jelly and reduced millet jelly may be appropriately further added, if necessary. An amount thereof to be used may be appropriately selected according to desired properties of the powdered preparation and the like.

The present aroma composition may additionally contain components that are commonly used in aroma compositions, if necessary. For example, the present aroma composition may contain: solvents such as water and ethanol; and aroma-retaining agents such as ethylene glycol, propylene glycol, dipropylene glycol, glycerin, hexyl glycol, benzyl benzoate, triethyl citrate, diethyl phthalate, hercolyn, middle-chain fatty acid triglycerides and middle-chain fatty acid diglycerides. That is, another embodiment of the present aroma composition (the present flavor-imparting composition) includes the solvent and/or the aroma-retaining agent in addition to the present compound. In the present description, "aroma-retaining agent" refers to an auxiliary agent that can reduce a volatility of components included in the aroma composition (flavor-imparting composition) to regulate aromatic properties and retaining properties of the present compound. Adding the aroma-retaining agent can retain the aroma of the aroma composition (flavor-imparting composition).

In addition, another embodiment of the present aroma composition (the present flavor-imparting composition) includes the solvent and/or the aroma-retaining agent and another aroma compound in addition to the present compound.

Furthermore, another embodiment of the present aroma composition (the present flavor-imparting composition) includes at least one selected from the group consisting of the solvent, the aroma-retaining agent and another aroma compound in addition to the present compound.

In each of the embodiments, contents of each component may be appropriately set according to notes of the product to be the adding target. In each of the embodiments, the other aroma compound preferably includes at least one selected from the group consisting of a natural essential oil, a natural aroma chemical and a synthetic aroma chemical. Specific examples of these aroma compounds are as described above.

(Method of Imparting Flavor to Flavor-Imparting Composition)

A method of imparting a flavor to a flavor-imparting composition according to an embodiment of the present invention (hereinafter, which may be referred to as the present method of imparting a flavor to a flavor-imparting composition) includes adding the present compound or the present flavor-imparting composition to another flavor-imparting composition.

By adding the present compound or the present flavor-imparting composition to a flavor-imparting composition (another flavor-imparting composition) as an adding target, it is possible to impart a flavor to the other flavor-imparting composition. More specifically, the present compound or the present flavor-imparting composition can improve a flavor of a flavor-imparting composition (another flavor-imparting composition) by imparting a citrus sense, a fresh top-note or peel feeling, a tasty feeling (spread) based thereon, and the like to the flavor-imparting composition as an adding target thereof. Thus, the present method of imparting a flavor to a flavor-imparting composition can improve the flavor of a flavor-imparting composition in addition to imparting an excellent citrus flavor to a flavor-imparting composition.

In the present method of imparting a flavor to a flavor-imparting composition, an amount (concentration) of the present flavor-imparting composition (the present compound) to be added to a flavor-imparting composition as the adding target is an effective amount that improves the flavor by the present compound included as an active component. The amount may be appropriately set according to a type and form of the flavor-imparting composition. When the flavor-imparting composition as the adding target is an aroma composition, examples of the concentration (the content) of the present compound in the aroma composition are as described in the above section of "Aroma composition."

In the present method of imparting a flavor to a flavor-imparting composition, a method of adding the present compound or the present flavor-imparting composition to the other flavor-imparting composition is not particularly limited. A period (timing) in which the present compound or the present flavor-imparting composition is added to the other flavor-imparting composition is also not particularly limited. Since the present compound is more stable than citral, as above, the period (timing) in which the present compound or the present flavor-imparting composition is added to the other flavor-imparting composition is advantageously flexible.

(Consumer Product)

A consumer product according to one embodiment of the present invention (hereinafter, which may be referred to as the present consumer product) includes the present compound or the present flavor-imparting composition. Since the present compound or the present flavor-imparting composition is added to the present consumer product, a flavor-imparted consumer product can be provided. More specifically, since the present compound or the present flavor-imparting composition is added to the present consumer product, a citrus sense, a fresh top-note or peel feeling, a tasty feeling (spread) based thereon, and the like are imparted to the present consumer product, and a flavor-improved consumer product can be provided. Among one or more of top, middle and last flavors, the top tasty feeling is particularly imparted to the present consumer product. In the present description, "consumer product" includes: foods and beverages; and products for non-eating or drinking such as perfumery and cosmetics, pharmaceuticals, and health and sanitary products. Among them, the present consumer product is preferably foods, beverages, perfumery or cosmetics.

In the present consumer product, an amount (concentration, content) of the present flavor-imparting composition (the present compound) to be added to the consumer product may be appropriately determined according to a flavor, degree of desired effect, and the like of the consumer product by the present compound included as an active component.

When the consumer product is foods or beverages, examples of the concentration (the content), as a concentration of the present compound, include a range of 1 ppb to 100 ppm (0.01%), preferably 1 ppb to 10 ppm, more preferably 10 ppb to 10 ppm, particularly preferably 50 ppb to 5 ppm, and most preferably 100 ppb to 1 ppm, relative to a total mass of the foods or beverages. More specifically, the lower limit is set to any one of 1 ppb, 10 ppb, 50 ppb, 100 ppb, 1 ppm, 5 ppm and 10 ppm, the upper limit is set to any one of 100 ppm, 10 ppm, 5 ppm, 1 ppm, 100 ppb, 50 ppb and 10 ppb, and the concentration (the content) may be within a range of any combination of these lower limit and upper limit, but the concentration is not limited thereto. A preferable example of the concentration (the content), as the concentration of the present compound, may be selected from 1 ppb to 100 ppb, 10 ppb to 1 ppm, 10 ppb to 10 ppm and 100 ppb to 10 ppm, relative to the total mass of the foods or beverages according to taste properties of the foods or beverages, but the concentration is not limited thereto.

Although depending on a type and flavor of the foods or beverages, the concentration (the content) of the present compound in the foods or beverages is preferably set within 1 ppb to 100 ppm, or further within the preferable range described above because the adding effect can be felt and the scent derived from the present compound is not excessively prominent. It is to be noted that the present compound may be added at a lower concentration than the lower limit or a higher concentration than the upper limit according to the flavor of the foods or beverages, or the like.

When the consumer product is perfumery or cosmetics, examples of the concentration (the content), as a concentration of the present compound, include a range of 1 ppb to 0.1%, preferably 10 ppb to 500 ppm (0.05%), and more preferably 50 ppb to 100 ppm, relative to a total mass of the perfumery or cosmetics. More specifically, the lower limit is set to any one of 1 ppb, 10 ppb, 50 ppb, 100 ppb, 1 ppm, 10 ppm, 100 ppm and 500 ppm, the upper limit is set to any one of 0.1%, 100 ppm, 10 ppm, 1 ppm, 100 ppb and 10 ppb, and examples of the concentration (the content) include a range of any combination of these lower limit and upper limit, but the concentration is not limited thereto. A preferable example of the concentration (the content), as the concentration of the present compound, may be selected from each range of 10 ppb to 10 ppm, 100 ppb to 100 ppm and 1 ppm to 0.1%, relative to the total mass of the perfumery or cosmetics according to aroma properties of the perfumery or cosmetics, but the concentration is not limited thereto. Although depending on a type and aroma of the perfumery or cosmetics, the concentration (the content) of the present compound in the perfumery or cosmetics is preferably set within 1 ppb to 0.1%, or further within the preferable range described above because the adding effect can be felt and the scent derived from the present compound is not excessively prominent. It is to be noted that the present compound may be added at a lower concentration than the lower limit or a higher concentration than the upper limit according to the aroma of the perfumery or cosmetics, or the like.

The present flavor-imparting composition (the present compound) itself may be added to the consumer product, or may be added to the consumer product together with one or more selected from one or two or more of water-soluble aroma chemicals, emulsified aroma compositions, any aroma compound and natural essential oils (for example, the aroma compounds described in the above "Collection of Well-known Prior Arts (Perfume) Section II Perfumes for Foods, published by Japan Patent Office," "Poundage surveys of flavoring substances used in Japan," and "Gosei Koryo: Kagaku to Shohin Chishiki (Synthetic Perfumes: Chemistry and Merchandise Knowledge))." That is, one embodiment of the present consumer product includes the present compound or the present flavor-imparting composition, and further includes at least one selected from a water-soluble aroma chemical, an emulsified aroma composition, another aroma compound and a natural essential oil.

The foods or beverages as the consumer product to which the present flavor-imparting composition (the present compound) can be added is not particularly limited, and examples thereof include foods and beverages having one or more tastes such as: various citrus tastes such as lemon, orange, grapefruit, lime, mandarin, Satsuma mandarin, kabosu (citrus), sudachi (citrus), hassaku (orange), iyokan (citrus iyo), yuzu (citrus), shiikuwasha (citrus) and kumquat; various fruit tastes such as strawberry, blueberry, raspberry, apple, cherry, plum, apricot, peach, pineapple, banana, melon, mango, papaya, kiwi fruit, pear, grape, Muscat and Kyoho (grape); a dairy taste such as milk, yoghurt and butter; a vanilla taste; various tea tastes such as green tea, black tea, oolong tea and herb tea; a coffee taste; a cola taste; a cacao taste; a cocoa taste; various mint tastes such as spearmint and peppermint; various spice or herb tastes such as cinnamon, chamomile, cardamom, caraway, cumin, clove, pepper, coriander, Japanese pepper, shiso (perilla), ginger, star anise, thyme, capsicum, nutmeg, basil, marjoram, rosemary, laurel, garlic and wasabi; various nut tastes such as almond, cashew nut and walnut; various alcoholic beverage tastes such as wine, brandy, whisky, rum, gin, liqueurs, sake, shochu (distilled Japanese alcoholic beverage) and beer; a vegetable taste such as onion, celery, carrot, tomato and cucumber; various meat tastes such as chicken, duck meat, pork, beef, mutton or lamb, and horsemeat; various seafood and seaweed tastes such as red-meat fishes such as tuna, whitefishes such as mackerel, sea bream, salmon and horse mackerel, freshwater fishes such as sweetfish, trout and carp, shellfishes such as turban shell, clam, short-necked clam and freshwater clam, various crustaceans such as shrimp and crab, and various seaweeds such as wakame (algae) and kombu (algae); various grain tastes such as rice, barley, wheat and malt; various oil and fat tastes such as oils and fats of meat such as beef tallow, chicken oil and lard, and oils of various fish. That is, the foods and beverages may be foods and beverages that cause to feel only one of the tastes, or may be foods and beverages that cause to feel two or more of the tastes, and the plurality of the tastes may be the same or different types. Former examples include foods and beverages that cause to feel a plurality of fruit tastes such as bananas, peaches and apples among the fruit tastes (so-called mix fruit taste). Latter examples include foods and beverages that cause to feel a citrus taste such as lemons and a milk taste (such as citrus-taste lactic acid bacteria beverages), and foods and beverages that cause to feel a mint taste or citrus taste and a cola taste (such as mint-flavored or lemon-flavored cola beverages).

More specific examples of the foods and beverages include confectionery such as rice crackers, arare (glutinous rice crackers), okoshi (puffed sweet rice cakes), rice cakes, manju (baked sweet dough stuffed), uiro (steamed sweet rice dough), bean pastes, yokan (red bean paste bar), mizu yokan (soft red bean jelly), kingyoku (sweet agar jelly), jelly, castella cakes, hard candies, biscuits, crackers, potato chips, cookies, pies, puddings, butter cream, custard cream, cream puffs, waffles, sponge cakes, donuts, chocolate, chewing gum, caramel, candies, and peanut paste or other pastes; breads, noodles, rices and other grains such as bread, udon (thick wheat noodle), ramen, Chinese noodle, sushi, gomoku meshi (rice boiled with fish and vegetables), Chinese fried rice, pilaf, dough for jiaozi, dough for shao-mai, okonomiyaki (Japanese-style savory pancake with various ingredients), and takoyaki (octopus dumplings); pickled products such as nukazuke (pickled products in rice bran), umeboshi (pickled and dried ume), fukuzinzuke (pickled products in soy sauce), bettarazuke (pickled products with rice koji), senmaizuke (pickled sliced radishes), rakkyo (Japanese scallion), misozuke (pickled products in salty rice bran paste), takuanzuke (pickled products with rice bran and salt), and pickle materials thereof; seafoods such as fishes such as mackerel, sardine, saury, salmon, tuna, bonito, whale, flatfish, sand lance and sweetfish, squids such as Japanese common squids, spear squids, cuttlefishes and firefly squid, octopuses such as common octopuses and ocellated octopuses, shrimps and lobsters such as prawns, botan shrimps, Japanese spiny lobsters and giant tiger prawns, crabs such as red king crabs, snow crabs, blue crabs and horsehair crabs, and shellfishes such as short-necked clams, clams, scallops, oysters and mussels; processed foods and beverages of seafoods such as canned foods, boiled fish, tsukudani (wholly simmered products in soy sauce and sugar), minced products, pasted seafood products (such as tubular kamaboko, kamaboko, fried kamaboko and crab-flavored kamaboko), fried foods, and tempura; meat such as chicken, pork, beef, mutton or lamb, and horsemeat; processed foods and beverages using meat such as curry, stew, beef stew, hash sauce, meat sauce, mapo tofu, hamburger stakes, jiaozis, material of kamameshi (pot rice), soups (such as corn soup, tomato soup and consomme soup), meat balls, kakuni (boiled meat cube) and canned meat; seasonings such as table salt, seasoned salt, soy sauce, powdered soy sauce, miso, powdered miso, moromi (mash for fermented seasoning), hishio (fermented seasoning from foods), furikake (seasoning mix for rice), seasoning mix for ochazuke (rice in soup stock), margarine, mayonnaise, dressing, vinegar, sanbaizu (soy sauce-containing vinegar), powdered sweeten vinegar, mix for Chinese seasoning, tempura soup, Japanese noodle soups (such as kombu stock or bonito stock), sauces (such as Japanese semi-thick sauce and tomato sauce), ketchup, sauce for barbecued meat, curry roux, stew roux, soup mix, soup stock mix (such as kombu stock or bonito stock), premixed seasoning, new-type mirin (sweet liquor seasoning), and premixed powder such as powder for fried foods and powder for takoyaki, and animal or vegetable soup stock-taste foods and beverages to which these seasonings are added; dairy foods such as cheese, yoghurt and butter; fermented foods by various yeasts such as beer yeast and bread yeast, or by various bacteria such as lactic acid bacteria; boiled foods such as boiled vegetables, chikuzennni (boiled chicken and vegetables), oden (Japanese hodgepodge) and pot cooking; ingredients and dish in takeout lunch; fruit juice beverages and refreshing beverages with fruit juice of fruits such as apples, grapes and citruses (such as grapefruits, oranges and lemons), fruit pulp juice beverages, and fruit juice beverages with fruit pulp; vegetable-containing foods and beverages such as vegetables such as tomatoes, green peppers, celeries, gourds, bitter gourds, carrots, potatoes, asparaguses, bracken fern and Japanese royal fern (fiddleheads), vegetable beverages including these vegetables, and vegetable soups; favorite beverages such as coffee, cocoa, green tea, black tea, oolong tea, refreshing beverages, cola beverages, carbonated beverages (such as sodas flavored with citrus flavors or the like) and lactic acid bacteria beverages; beverages including natural remedies or herbs; functional beverages such as cola beverages, fruit juice beverages, dairy beverages, beer-taste beverages including non-alcohol beer and "the third beer," which uses less malt than beer, sports drinks, honey beverages, vitamin-supplying beverages, mineral-supplying beverages, energy drinks, nutritious drinks, and lactic acid bacteria beverages; non-alcohol favorite beverages such as alcohol-taste beverages with various tastes (beer taste, plum-liquor taste and shochu-highball taste); and wine, shochu, awamori, sake, beer, shochu highball, cocktail drinks, happoshu (low-malt beer-like beverage), fruit wines, medicinal alcoholic beverages, other brewages (sparkling), and liqueurs (sparkling), or alcoholic beverages including them.

Among them, a preferable embodiment of the present consumer product (foods and beverages) is fruit juice beverages, refreshing beverages with fruit juice, fruit pulp juice beverages, or fruit juice beverages with fruit pulp. A more preferable embodiment thereof is citrus fruit juice beverages or refreshing beverages with citrus fruit juice; and citrus fruit pulp juice beverages or fruit juice beverages with citrus fruit pulp.

Perfumery and cosmetics as the consumer product to which the present flavor-imparting composition (the present compound) can be added is not particularly limited, and examples thereof include: perfumes such as eau de colognes, eau de toilettes, eau de parfums and parfums; hair care products such as shampoo, rinse and hairdressing products (such as hair cream and pomade); cosmetics such as foundation, lipsticks, lip cream, lip gloss, skin lotion, cosmetic emulsion, cosmetic cream, cosmetic gel, serum and pack agents; deodorant products such as antiperspirant sprays, deodorant sheets, deodorant cream and deodorant sticks; inorganic-salt, refreshing, carbonate, skin-caring, enzymatic or natural-remedy bathing agents; suntan cosmetics such as suntan products and sunscreen products; health and sanitary detergents such as face washes such as face soap and facewash cream, soap for body and body soap, laundry soap, laundry detergents, disinfectant detergents, deodorant detergents, softening agents, kitchen detergents, and cleaning detergents; health and sanitary materials such as dentifrices, mouth-washing liquid, tissue paper and toilet paper; and fragrant products such as fragrant and deodorant agents for rooms or cars, and as room fragrances.

Among them, a preferable embodiment of the present consumer product (perfumery and cosmetics) is health and sanitary detergents, or health and sanitary materials. A more preferable embodiment is health and sanitary detergents or health and sanitary materials having at least one note selected from the group consisting of citrus notes, fruit notes and floral notes.

A note for which the present flavor-imparting composition (the present compound) can be used is not limited, and may be any note whose flavor can be improved by the present flavor-imparting composition (the present compound). Since the present flavor-imparting composition (the present compound) can impart a citrus sense, a fresh top-note or peel feeling, a tasty feeling (spread) based thereon, and the like when added to various products having citrus notes, the present flavor-imparting composition (the present compound) can be preferably used for citrus notes, fruity notes, green notes, woody notes, moss note and the like.

(Method of Imparting Flavor to Consumer Product)

A method of imparting a flavor to a consumer product according to an embodiment of the present invention (hereinafter, which may be referred to as the present method of imparting a flavor to a consumer product) includes adding the present compound or the present flavor-imparting composition to a consumer product.

The present flavor-imparting composition (the present compound) can impart a flavor to consumer products such as foods and beverages, and perfumery and cosmetics by adding an effective amount thereof to the consumer products. More specifically, the present flavor-imparting composition (the present compound) can improve a flavor of a consumer product by imparting a citrus sense, a fresh top-note or peel feeling, a tasty feeling (spread) based thereon, and the like to the consumer product as an adding target. The present flavor-imparting composition (the present compound) can particularly impart a top flavor and a tasty feeling (spread), among one or more of top, middle and last flavors, by adding the effective amount thereof to the consumer products such as foods, beverages, perfumery and cosmetics.

In the present method of imparting a flavor to a consumer product, an amount (concentration, content) of the present flavor-imparting composition (the present compound) to be added to the consumer product is an effective amount that improves the flavor by the present compound included as an active component. The amount may be appropriately set according to a type and form of the consumer product. In this case, examples of the concentration (the content) of the present compound in the consumer product are as described in the above section of "Consumer product."

In the method of imparting a flavor to a consumer product, a method of adding the present compound or the present flavor-imparting composition to a consumer product is not particularly limited. A period (timing) in which the present compound or the present flavor-imparting composition is added to a consumer product is also not particularly limited. Since the present compound is more stable than citral, as above, the period (timing) in which the present compound or the present flavor-imparting composition is added to a consumer product is advantageously flexible.

The described embodiments of the present invention in detail are descriptive and exemplary, and not limiting. It is obvious that the scope of the present invention should be interpreted with the scope of the attached claims.

The present invention includes the following aspects and embodiments.

1. A compound represented by the following formula (1).

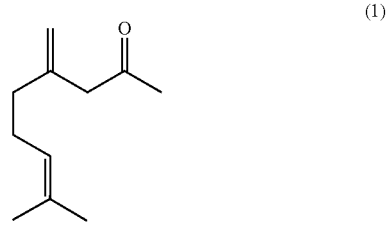

2. A flavor-imparting composition, including the compound according to the above item 1.

3. A consumer product, including the compound according to the above item 1 or the flavor-imparting composition according to the above item 2.

4. A method of imparting a flavor to a flavor-imparting composition, including a step of adding the compound according to the above item 1 or the flavor-imparting composition according to the above item 2 to another flavor-imparting composition.

5. A method of imparting a flavor to a consumer product, the method including a step of adding the compound according to the above item 1 or the flavor-imparting composition according to the above item 2 to a consumer product.

EXAMPLES

The present invention will be more specifically described below by Examples. The present invention is not limited to these Examples.

[Example 1] Synthetic Example of the Present Compound

The present compound was synthesized via the following steps of Examples 1-1 to 1-3 (the above Reaction route A). When an isomerized product other than the exo-form is generated, in the reaction formula, a double bond position in the isomerized product other than the exo-form is shown by a broken line.

Example 1-1: Conversion of Geranic Acid into Exo-Isogeranic Acid

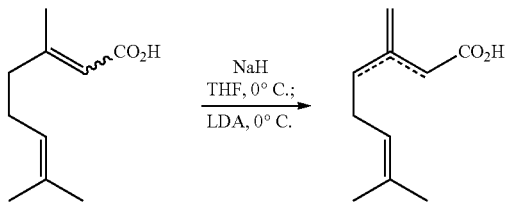

To a 5-L four-neck flask, tetrahydrofuran (THF, 2.0 L) was added and cooled with ice under a nitrogen atmosphere, sodium hydride (60%, 84.0 g, 2.10 mol) was added, and subsequently geranic acid (337 g, 2.00 mol) was added dropwise over 40 minutes. The mixture was stirred for 30 minutes withholding the above temperature, and then lithium diisopropylamide (LDA, 2.0 mol/L tetrahydrofuran solution, 1.15 L, 2.30 mol) was added dropwise over 75 minutes. After 1 hour and 20 minutes with holding the above temperature, the reaction liquid was poured into a diluted hydrochloric acid to quench the reaction, and then layers were separated. A combined mixture of the obtained organic layer and an extraction solution obtained by extracting the separated aqueous layer with toluene was washed three times with an aqueous saturated saline solution. A solvent in the obtained organic layer was removed under a reduced pressure to obtain a crudely purified product (411 g), and the product was distilled under a reduced pressure to obtain 280 g of exo-isogeranic acid (the compound of the formula (3) where R is H) (1.67 mol, 83.4% yield, 67.4% exo-form).

Example 1-2: Conversion of Exo-Isogeranic Acid into Exo-Isogeranic Amide

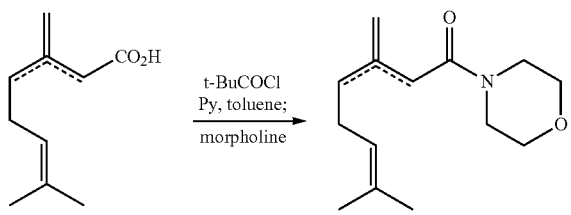

To a 3-L four-neck flask, pyridine (136 g, 1.71 mol) and toluene (920 mL) were added and cooled with ice under a nitrogen atmosphere, and exo-isogeranic acid (262 g, 1.56 mol) obtained in Example 1-1, which was a raw material, was added. Pivaloyl chloride (207 g, 1.71 mol) was subsequently added to the mixture, after the temperature was raised to room temperature, the temperature was held for 1.5 hours, then the mixture was cooled with ice, and morpholine (305 g, 3.50 mol) was added. The reaction was finished after 1 hour with holding the above temperature, and the reaction liquid was poured into a diluted hydrochloric acid. After layer separation, a combined mixture of the obtained organic layer and an extraction solution obtained by extracting the separated aqueous layer with toluene was washed with a 20% saline solution, a 20% aqueous sodium carbonate solution and a 20% saline solution in this order. A solvent in the obtained organic layer was removed under a reduced pressure to obtain a crudely purified product (394 g) of exo-isogeranic morpholine amide (the compound represented by the formula (4)).

Example 1-3: Conversion of Exo-Isogeranic Amide into the Present Compound

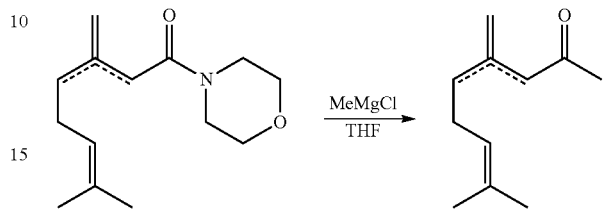

To a 3-L four-neck flask, the crudely purified product of exo-isogeranic morpholine amide (394 g) obtained in Example 1-2, which was a raw material, and anhydrous tetrahydrofuran (1.0 L) were added, and the mixture was cooled with ice under a nitrogen atmosphere and methylmagnesium chloride (3.0 mol/L tetrahydrofuran solution, 624 mL, 1.87 mol) was added dropwise over 50 minutes. The reaction was finished after 4.5 hours with holding the above temperature, and the reaction liquid was poured into a 20% aqueous ammonium chloride solution. After a layer separation, a combined mixture of the obtained organic layer and an extraction solution obtained by extracting the separated aqueous layer with ethyl acetate was washed with a diluted hydrochloric acid. The obtained organic layer was washed with a 5% aqueous sodium hydrogen carbonate, then a 20% saline solution twice, and then dried with magnesium sulfate anhydrate. After filtration, a solvent was removed under a reduced pressure to form a crudely purified product, and the product was purified by precise distillation under a reduced pressure to obtain 90 g of the present compound with a purity of 95.5% (hereinafter, which may be referred to as the present invention product 1-1).

Physical Property Values of the Present Compound Synthesized in Example 1

$^1$H-NMR (400 MHz, CDCl$_3$): δ 1.60 (s, 3H), 1.68 (s, 3H), 2.03-2.12 (m, 4H), 2.16 (s, 3H), 3.12 (s, 2H), 4.88 (s, 1H), 4.97 (s, 1H), 5.08 (m, 1H).

$^{13}$C-NMR (100 MHz, CDCl$_3$): δ17.7, 25.7, 26.0, 29.1, 36.0, 51.8, 114.1, 123.5, 132.0, 142.9, 207.2.

MS (EI, 70 eV) m/z: 43 (58), 69 (100), 81 (19), 108 (49), 123 (39), 151 (5), 166 (4).

[Example 2] Aroma Properties of the Present Compound

An aroma of the present compound was evaluated by the following procedure. A 1% ethanol solution of the present invention product 1-1 was prepared and used as the present invention product 2-1. As a comparative reference to the present compound, a 1% ethanol solution of citral was prepared and used as the comparative product 2-1, and a 1% ethanol solution of 4,8-dimethylnona-3,7-dien-2-one was prepared and used as the comparative product 2-2. 5 well-trained panelists having 10 years or more of experience sniffed at the present invention product 2-1 and the comparative products 2-1 and 2-2, and commented on felt aromas. Representative comments are shown in Table 1.

TABLE 1

|  | Compound added | Concentration | Comment |
|---|---|---|---|
| Present invention product 2-1 | 8-Methyl-4-methyl-enenona-7-en-2-one | 1% | Citrus-like |
| Comparative product 2-1 | Citral | 1% | Citrus-like |
| Comparative product 2-2 | 4,8-Dimethylnona-3,7-dien-2-one | 1% | Citrus-like, floral-like (especially rose-like) |

The compound 4,8-dimethylnona-3,7-dien-2-one included in the comparative product 2-2, which has been used as the citral-alternative compound, has an aspect of floral aromas in addition to citrus aromas, as shown in Table 1; thus, has limitations, for example, on a concentration, for use as the citral-alternative compound.

Meanwhile, the present compound included in the invention product 2-1 does not have the aspect of floral aromas, different from the comparative product 2-2, and the present compound was confirmed to be useful as the citral-alternative compound.

[Example 3] Evaluation of Stability of the Present Compound

A stability of the present compound was evaluated by the following procedure. An aqueous solution including 7% granulated sugar and 0.12% citric acid (hereinafter, which may be referred to as a sugar-acid solution) was prepared. To this sugar-acid solution, the present invention product 1-1 was added so that the concentration was 0.1% to obtain the present invention product 3-1. As a comparative reference to the present compound, citral was added to a separately prepared sugar-acid solution so that the concentration was 0.1% to obtain the comparative product 3-1. Then, the present invention product 3-1 and the comparative product 3-1 were stored at room temperature (25° C.) for 8 weeks under light shielding.

On the present invention product 3-1 and the comparative product 3-1, the present compound and citral were quantitatively analyzed by the internal standard method by using 2-chlorophenol as an internal standard substance under the following GC analysis conditions.
<GC Measuring Method>
The measurements were performed by using a GC/MS (apparatus name: GC 7890A/MSD 5975C, manufactured by Agilent Technologies Japan, Ltd.). The GC/MS analysis conditions were as follows.
(Gc Conditions)
  GC column for GC/MS measurement: InertCap (Registered trademark)-WAX, manufactured by GL Sciences Inc. (length:
  60 m, internal diameter: 0.25 mm, film thickness of liquid layer: 0.25 μm)
  Heating conditions: 40° C. to 230° C., heating at 5.0° C./min, holding for 20 min.
  Column flow rate: 1.0 mL/min.
(MS Conditions)
  Electron Ionization (EI), 70 eV
  Scanning range: 50 to 300
As a result, citral in the comparative product 3-1 completely disappeared, while the present compound in the present invention product 3-1 was just reduced to 90% of the initial concentration under the same conditions. Therefore, it was confirmed that the present compound is superior to citral from the viewpoint of stability and useful as the citral-alternative compound.

[Example 4] Effect of Addition to Aroma Composition (Orange-Like)

An aroma composition of orange-basic preparation was prepared in accordance with the formulation in Table 2.

TABLE 2

| (Formulation 1) Aroma composition of orange-basic preparation (control product) Component name | Added amount (parts by mass) |
|---|---|
| Vanillin | 1.0 |
| Hexanal | 1.0 |
| β-Sinensal | 2.0 |
| Geraniol | 3.0 |
| Decanal | 4.0 |
| Ethyl butyrate | 5.0 |
| Limonene | 10.0 |
| Linalool | 10.0 |
| Ethanol | 164.0 |
| Water | 300.0 |
| Orange essence | 500.0 |
| Total | 1000.0 |

The present invention product 1-1 was diluted with ethanol, if necessary, to prepare a flavor-imparting composition, and this flavor-imparting composition was added to the above aroma composition of orange-basic preparation. Each of the aroma compositions of the present invention products 4-1 to 4-3 was prepared by adding the flavor-imparting composition so that a concentration of the present compound in the aroma composition of orange-basic preparation was the concentration shown in Table 3. To the aroma composition of orange-basic preparation, 4,8-dimethylnona-3,7-dien-2-one was added so that a concentration thereof was the concentration shown in Table 3 to prepare an aroma composition of the comparative product 4-1. On the obtained aroma compositions of the present invention products 4-1 to 4-3 and the comparative product 4-1, organoleptic evaluation was performed by 15 well-trained panelists (10 years or more of experience). The organoleptic evaluation was performed by comparing each of the above aroma compositions with the aroma composition of orange-basic preparation to which neither the present invention product 1-1 nor 4,8-dimethylnona-3,7-dien-2-one was added as the control product. Specifically, the organoleptic evaluation was performed by commenting on aromas by the panelists with comparing each of the present invention products 4-1 to 4-3 and the comparative product 4-1 with the control product, and averaging values on the natural feeling scored by the panelists in accordance with the following evaluation criteria with reference to the control product. Here, the natural feeling means sensation rich in fruit juice feel and fruit peel feel, and causing a feel of a fresh whole fruit itself.
<Evaluation Criteria of Natural Feeling>
  Enhanced remarkably with reference to the control product: 4
  Enhanced largely with reference to the control product: 3
  Enhanced in some degrees with reference to the control product: 2
  Enhanced slightly with reference to the control product: 1
  Similar to the control product: 0

The results of the organoleptic evaluation are shown in Table 3.

TABLE 3

| | Compound added | Concentration | Score (natural feeling) | Comment |
|---|---|---|---|---|
| Present invention product 4-1 | 8-Methyl-4-methyl-enenona-7-en-2-one | 100 ppb | 2.0 | Citrus sense was enhanced in a certain degree. |
| Present invention product 4-2 | | 100 ppm | 3.2 | Fresh feeling and peel feeling of orange were felt. |
| Present invention product 4-3 | | 10% | 3.0 | Fresh feeling and peel feeling of orange were strongly felt. |
| Comparative product 4-1 | 4,8-Dimethyl-nona-3,7-dien-2-one | 100 ppm | — | Peel feeling of orange was enhanced, but extraneous floral scent was also enhanced. |

As shown in Table 3, the present invention product 1-1 including the present compound was confirmed to impart a fresh feeling and a peel feeling to the orange aroma composition. As shown in Table 3, it was demonstrated that the present compound does not have the same problem as 4,8-dimethylnona-3,7-dien-2-one, which imparts an extraneous floral scent and that the present compound is useful as the citral-alternative compound to replace 4,8-dimethyl-nona-3,7-dien-2-one.

[Example 5] Effect of Addition to Aroma Composition (Lemon-Like)

An aroma composition of lemon-basic preparation was prepared in accordance with the formulation in Table 4.

TABLE 4

| (Formulation 2) Aroma composition of lemon-basic preparation (control product) Component name | Added amount (parts by mass) |
|---|---|
| β-Pinene | 1.0 |
| Geranyl acetate | 1.0 |
| cis-3-Hexenol | 1.0 |
| Geraniol | 1.5 |
| Octanal | 2.0 |
| Citronellal | 3.0 |
| Nerol | 3.0 |
| Linalool | 5.0 |
| α-Terpineol | 5.0 |
| Limonene | 5.0 |
| Ethanol | 372.5 |
| Water | 300.0 |
| Lemon essence | 300.0 |
| Total | 1000.0 |

The present invention product 1-1 was diluted with ethanol, if necessary, to prepare a flavor-imparting composition, and this flavor-imparting composition was added to the above aroma composition of lemon-basic preparation. Each of the aroma compositions of the present invention products 5-1 to 5-3 was prepared by adding the flavor-imparting composition so that a concentration of the present compound in the aroma composition of lemon-basic preparation was the concentration shown in Table 5. To the aroma composition of lemon-basic preparation, 4,8-dimethylnona-3,7-dien-2-one was added so that a concentration thereof was the concentration shown in Table 5 to prepare an aroma composition of the comparative product 5-1. On the obtained aroma compositions of the present invention products 5-1 to 5-3 and the comparative product 5-1, organoleptic evaluation was performed by 15 well-trained panelists (10 years or more of experience). The organoleptic evaluation was performed by comparing each of the above aroma compositions with the aroma composition of lemon-basic preparation to which neither the present invention product 1-1 nor 4,8-dimethylnona-3,7-dien-2-one was added as the control product. Specifically, the organoleptic evaluation was performed by commenting on aromas by the panelists with comparing each of the present invention products 5-1 to 5-3 and the comparative product 5-1 with the control product, and averaging values scored by the panelists in accordance with the evaluation criteria of natural feeling in Example 4 with reference to the control product.

The results of the organoleptic evaluation are shown in Table 5.

TABLE 5

| | Compound added | Concentration | Score (natural feeling) | Comment |
|---|---|---|---|---|
| Present invention product 5-1 | 8-Methyl-4-methyl-enenona-7-en-2-one | 100 ppb | 2.0 | Citrus sense was enhanced in a certain degree. |
| Present invention product 5-2 | | 100 ppm | 3.2 | Fresh feeling and peel feeling of lemon were felt. |
| Present invention product 5-3 | | 10% | 3.0 | Fresh feeling and peel feeling of lemon were strongly felt. |
| Comparative product 5-1 | 4,8-Dimethyl-nona-3,7-dien-2-one | 100 ppm | — | Peel feeling of lemon was enhanced, but extraneous floral scent was also enhanced. |

As shown in Table 5, the present invention product 1-1 including the present compound was confirmed to impart a fresh feeling and a peel feeling to the lemon aroma composition. As shown in Table 5, it was demonstrated that the present compound does not have the same problem as 4,8-dimethylnona-3,7-dien-2-one, which imparts an extraneous floral scent and that the present compound is useful as the citral-alternative compound to replace 4,8-dimethyl-nona-3,7-dien-2-one.

[Example 6] Effect of Addition to Aroma Composition (Yoghurt-Like)

An aroma composition of yoghurt-basic preparation was prepared in accordance with the formulation in Table 6.

TABLE 6

| (Formulation 3) Aroma composition of yoghurt-basic preparation (control product) Component name | Added amount (parts by mass) |
|---|---|
| Diacetyl | 3.0 |
| Ethyl propionate | 3.0 |
| Ethylvanillin | 8.0 |

TABLE 6-continued

| (Formulation 3) Aroma composition of yoghurt-basic preparation (control product) Component name | Added amount (parts by mass) |
|---|---|
| Ethyl acetate | 20.0 |
| Vanillin | 40.0 |
| Ethanol | 926.0 |
| Total | 1000.0 |

The present invention product 1-1 was diluted with ethanol, if necessary, to prepare a flavor-imparting composition, and this flavor-imparting composition was added to the above aroma composition of yoghurt-basic preparation. Each of the aroma compositions of the present invention products 6-1 to 6-3 was prepared by adding the flavor-imparting composition so that a concentration of the present compound in the aroma composition of yoghurt-basic preparation was the concentration shown in Table 7. On the obtained aroma compositions of the present invention products 6-1 to 6-3, organoleptic evaluation was performed by 5 well-trained panelists (10 years or more of experience). The organoleptic evaluation was performed by commenting on aromas by the panelists with comparing each of the present invention products 6-1 to 6-3 with the aroma composition of yoghurt-basic preparation to which the present invention product 1-1 was not added as the control product.

The results of the organoleptic evaluation are shown in Table 7.

TABLE 7

| | Compound added | Concentration | Comment |
|---|---|---|---|
| Present invention product 6-1 | 8-Methyl-4-methylenenona-7-en-2-one | 100 ppb | Invigorating feeling was enhanced. |
| Present invention product 6-2 | | 100 ppm | Citrus feeling was imparted, and freshness feeling was obtained. |
| Present invention product 6-3 | | 10% | Citrus feeling was imparted, and peel feeling of lemon was felt. |

As shown in Table 7, the present invention product 1-1 including the present compound was confirmed to impart a citrus feeling, a freshness feeling and a peel feeling to the yoghurt aroma composition.

[Example 7] Effect of Addition to Aroma Composition (Spicy-Citrus-Like)

An aroma composition of spicy citrus-basic preparation was prepared in accordance with the formulation in Table 8.

TABLE 8

| (Formulation 4) Aroma composition of spicy-citrus-basic preparation (control product) Component name | Added amount (parts by mass) |
|---|---|
| Linalool | 0.1 |
| Nutmeg oil | 4.0 |
| Cinnamaldehyde | 10.0 |

TABLE 8-continued

| (Formulation 4) Aroma composition of spicy-citrus-basic preparation (control product) Component name | Added amount (parts by mass) |
|---|---|
| Lime oil | 14.0 |
| Ethanol | 971.9 |
| Total | 1000.0 |

The present invention product 1-1 was diluted with ethanol, if necessary, to prepare a flavor-imparting composition, and this flavor-imparting composition was added to the above aroma composition of spicy citrus-basic preparation. Each of the aroma compositions of the present invention products 7-1 to 7-3 was prepared by adding the flavor-imparting composition so that a concentration of the present compound in the aroma composition of spicy citrus-basic preparation was the concentration shown in Table 9. On the obtained aroma compositions of the present invention products 7-1 to 7-3, organoleptic evaluation was performed by 5 well-trained panelists (10 years or more of experience). The organoleptic evaluation was performed by commenting on aromas by the panelists with comparing each of the present invention products 7-1 to 7-3 with the aroma composition of spicy citrus-basic preparation to which the present invention product 1-1 was not added as the control product.

The results of the organoleptic evaluation are shown in Table 9.

TABLE 9

| | Compound added | Concentration | Comment |
|---|---|---|---|
| Present invention product 7-1 | 8-Methyl-4-methylenenona-7-en-2-one | 100 ppb | Refreshing feeling and fresh feeling were felt. |
| Present invention product 7-2 | | 100 ppm | Refreshing feeling and fresh feeling were strongly felt. |
| Present invention product 7-3 | | 10% | Citrus feeling was enhanced, and refreshing feeling was strongly felt. |

As shown in Table 9, the present invention product 1-1 including the present compound was confirmed to impart a refreshing feeling and a fresh feeling to the spicy citrus aroma composition.

[Example 8] Effect of Addition to Aroma Composition (Flavored-Soda-Like)

An aroma composition of flavored-soda-basic preparation was prepared in accordance with the formulation in Table 10.

TABLE 10

| (Formulation 5) Aroma composition of flavored-soda-basic preparation (control product) Component name | Added amount (parts by mass) |
|---|---|
| Allyl caproate | 1.0 |
| Vanillin | 2.0 |

TABLE 10-continued

| (Formulation 5) Aroma composition of flavored-soda-basic preparation (control product) Component name | Added amount (parts by mass) |
|---|---|
| Amyl butyrate | 4.0 |
| Orange oil | 5.0 |
| Ethyl butyrate | 8.0 |
| Ethyl acetate | 20.0 |
| Amyl acetate | 20.0 |
| Ethanol | 940.0 |
| Total | 1000.0 |

The present invention product 1-1 was diluted with ethanol, if necessary, to prepare a flavor-imparting composition, and this flavor-imparting composition was added to the above aroma composition of flavored-soda-basic preparation. Each of the aroma compositions of the present invention products 8-1 to 8-3 was prepared by adding the flavor-imparting composition so that a concentration of the present compound in the aroma composition of flavored-soda-basic preparation was the concentration shown in Table 11. On the obtained aroma compositions of the present invention products 8-1 to 8-3, organoleptic evaluation was performed by 5 well-trained panelists (10 years or more of experience). The organoleptic evaluation was performed by commenting on aromas by the panelists with comparing each of the present invention products 8-1 to 8-3 with the aroma composition of flavored-soda-basic preparation to which the present invention product 1-1 was not added as the control product.

The results of the organoleptic evaluation are shown in Table 11.

TABLE 11

| | Compound added | Concentration | Comment |
|---|---|---|---|
| Present invention product 8-1 | 8-Methyl-4-methylenenona-7-en-2-one | 100 ppb | Refreshing feeling was felt. |
| Present invention product 8-2 | | 100 ppm | Refreshing feeling was strongly felt. |
| Present invention product 8-3 | | 10% | Citrus feeling was enhanced, and refreshing feeling was strongly felt. |

As shown in Table 11, the present invention product 1-1 including the present compound was confirmed to impart a refreshing feeling and a citrus feeling to the flavored-soda aroma composition.

[Example 9] Effect of Addition to Aroma Composition (Apple-Like)

An aroma composition of apple-basic preparation was prepared in accordance with the formulation in Table 12.

TABLE 12

| (Formulation 6) Aroma composition of apple-basic preparation (control product) Component name | Added amount (parts by mass) |
|---|---|
| cis-3-Hexenol | 0.5 |
| Maltol | 5.0 |
| Terpenyl isovalerate | 1.0 |
| Citronellyl isobutyrate | 1.0 |
| Citronellal | 1.0 |
| γ-Undecalactone | 1.0 |
| Linalool | 1.5 |
| Isoamyl caproate | 2.0 |
| Citronellol | 2.0 |
| Decanal | 2.0 |
| Vanillin | 4.0 |
| Phenylethyl isobutyrate | 5.0 |
| Amyl butyrate | 10.0 |
| Amyl acetate | 16.0 |
| Geranyl acetate | 16.0 |
| Cinnamyl isovalerate | 16.0 |
| Amyl valerate | 20.0 |
| Propylene glycol | 500.0 |
| Ethanol | 396.0 |
| Total | 1000.0 |

The present invention product 1-1 was diluted with ethanol, if necessary, to prepare a flavor-imparting composition, and this flavor-imparting composition was added to the above aroma composition of apple-basic preparation. Each of the aroma compositions of the present invention products 9-1 to 9-3 was prepared by adding the flavor-imparting composition so that a concentration of the present compound in the aroma composition of apple-basic preparation was the concentration shown in Table 13. On the obtained aroma compositions of the present invention products 9-1 to 9-3, organoleptic evaluation was performed by 5 well-trained panelists (10 years or more of experience). The organoleptic evaluation was performed by commenting on aromas by the panelists with comparing each of the present invention products 9-1 to 9-3 with the aroma composition of apple-basic preparation to which the present invention product 1-1 was not added as the control product.

The results of the organoleptic evaluation are shown in Table 13.

TABLE 13

| | Compound added | Concentration | Comment |
|---|---|---|---|
| Present invention product 9-1 | 8-Methyl-4-methylenenona-7-en-2-one | 100 ppb | Fresh feeling was felt. |
| Present invention product 9-2 | | 100 ppm | Fresh feeling was strongly felt. |
| Present invention product 9-3 | | 10% | Citrus feeling was strongly felt with fresh feeling. |

As shown in Table 13, the present invention product 1-1 including the present compound was confirmed to impart a fresh feeling to the apple aroma composition.

[Example 10] Effect of Addition to Aroma Composition (Pineapple-Like)

An aroma composition of pineapple-basic preparation was prepared in accordance with the formulation in Table 14.

TABLE 14

| (Formulation 7) Aroma composition of pineapple-basic preparation (control product) Component name | Added amount (parts by mass) |
|---|---|
| Linalool | 1.0 |
| Ethyl caprylate | 1.0 |
| Ethyl caproate | 1.0 |
| Ethyl caprate | 1.0 |
| Maltol | 1.0 |
| Isovaleric acid | 1.0 |
| Diethyl malonate | 1.0 |
| Allyl caproate | 1.0 |
| Isoamyl alcohol | 2.0 |
| Isoamyl valerate | 2.0 |
| Isobutyric acid | 3.0 |
| Isoamyl acetate | 4.0 |
| Ethyl butyrate | 10.0 |
| Ethyl acetate | 12.0 |
| Propylene glycol | 500.0 |
| Ethanol | 459.0 |
| Total | 1000.0 |

The present invention product 1-1 was diluted with ethanol, if necessary, to prepare a flavor-imparting composition, and this flavor-imparting composition was added to the above aroma composition of pineapple-basic preparation. Each of the aroma compositions of the present invention products 10-1 to 10-3 was prepared by adding the flavor-imparting composition so that a concentration of the present compound in the aroma composition of pineapple-basic preparation was the concentration shown in Table 15. On the obtained aroma compositions of the present invention products 10-1 to 10-3, organoleptic evaluation was performed by 5 well-trained panelists (10 years or more of experience). The organoleptic evaluation was performed by commenting on aromas by the panelists with comparing each of the present invention products 10-1 to 10-3 with the aroma composition of pineapple-basic preparation to which the present invention product 1-1 was not added as the control product.

The results of the organoleptic evaluation are shown in Table 15.

TABLE 15

| | Compound added | Concentration | Comment |
|---|---|---|---|
| Present invention product 10-1 | 8-Methyl-4-methylene nona-7-en-2-one | 100 ppb | Fresh feeling was felt. |
| Present invention product 10-2 | | 100 ppm | Fresh feeling was strongly felt. |
| Present invention product 10-3 | | 10% | Citrus feeling was strongly felt with fresh feeling. |

As shown in Table 15, the present invention product 1-1 including the present compound was confirmed to impart a fresh feeling to the pineapple aroma composition.

[Example 11] Effect of Addition to Aroma Composition (Ginger-Like)

A crushed product of ginger was obtained by crushing 200 g of ginger with a mixer. To this crushed product of ginger, 100 g of rice-bran salad oil was added, and stirring extraction was performed under room temperature for 1 hour to obtain an extract. This extract was separated with soil-liquid separation by centrifuging to obtain an extraction liquid. This extraction liquid was left to stand, and the separated oil-layer part was separated by decantation and dehydrated to prepare a clear aroma composition of ginger-basic preparation.

The present invention product 1-1 was diluted with ethanol, if necessary, to prepare a flavor-imparting composition, and this flavor-imparting composition was added to the above aroma composition of ginger-basic preparation. Each of the aroma compositions of the present invention products 11-1 to 11-3 was prepared by adding the flavor-imparting composition so that a concentration of the present compound in the aroma composition of ginger-basic preparation was the concentration shown in Table 16. On the obtained aroma compositions of the present invention products 11-1 to 11-3, organoleptic evaluation was performed by 5 well-trained panelists (10 years or more of experience). The organoleptic evaluation was performed by commenting on aromas by the panelists with comparing each of the present invention products 11-1 to 11-3 with the aroma composition of ginger-basic preparation to which the present invention product 1-1 was not added as the control product.

The results of the organoleptic evaluation are shown in Table 16.

TABLE 16

| | Compound added | Concentration | Comment |
|---|---|---|---|
| Present invention product 11-1 | 8-Methyl-4-methylenenona-7-en-2-one | 100 ppb | Invigorating feeling and fresh feeling of ginger were felt. |
| Present invention product 11-2 | | 100 ppm | Invigorating feeling and fresh feeling of ginger were strongly felt. |
| Present invention product 11-3 | | 10% | Citrus feeling was strongly felt with invigorating feeling and fresh feeling of ginger. |

As shown in Table 16, the present invention product 1-1 including the present compound was confirmed to impart an invigorating feeling and a fresh feeling to the ginger aroma composition.

[Example 12] Effect of Addition to Foods and Beverages (Citrus-Taste Beverage)

<Example 12-1> Lemon-Taste Beverage

To a sugar-acid solution including 7% granulated sugar and 0.12% citric acid, 0.1% of an aroma composition of lemon-basic preparation obtained in the same manner as in Example 5 was added to obtain a lemon-basic beverage. The present invention product 1-1 was diluted with ethanol, if necessary, to prepare a flavor-imparting composition, and this flavor-imparting composition was added to the above lemon-basic beverage. Each of the lemon-taste beverages of the present invention products 12-1 to 12-5 was prepared by adding the flavor-imparting composition so that a concentration of the present compound in the lemon-basic beverage was the concentration shown in Table 17. To the lemon-basic beverage, 4,8-dimethylnona-3,7-dien-2-one was added so that a concentration thereof was the concentration shown in Table 17 to prepare a lemon-taste beverage of the comparative product 12-1.

On the obtained lemon-taste beverages of the present invention products 12-1 to 12-5 and the comparative product 12-1, organoleptic evaluation was performed by 15 well-trained panelists (10 years or more of experience). The organoleptic evaluation was performed by comparing each of the above lemon-taste beverages with the lemon-basic beverage to which neither the present invention product 1-1 nor 4,8-dimethylnona-3,7-dien-2-one was added as the control product. Specifically, the organoleptic evaluation was performed by commenting on a difference in flavors by the panelists with comparing each of the present invention products 12-1 to 12-5 and the comparative product 12-1 with the control product, and averaging values on the natural feeling scored by the panelists in accordance with the evaluation criteria in Example 4.

The results of the organoleptic evaluation are shown in Table 17. Table 17 also shows the results of the organoleptic evaluation of Examples 12-2 and 12-3.

TABLE 17

| | Adding target | Compound added | Concentration | Score (natural feeling) | Comment |
|---|---|---|---|---|---|
| Present invention product 12-1 | Lemon-basic beverage | 8-Methyl-4-methyl-enenona-7-en-2-one | 1 ppb | 2.1 | Fresh feeling was slightly enhanced. |
| Present invention product 12-2 | | | 10 ppb | 2.7 | Fresh feeling of lemon was somewhat strongly felt. |
| Present invention product 12-3 | | | 100 ppb | 3.3 | Fresh feeling of lemon was strongly felt. |
| Present invention product 12-4 | | | 1 ppm | 3.5 | Fresh feeling and peel feeling of lemon were strongly felt. |
| Present invention product 12-5 | | | 10 ppm | 2.0 | Peel feeling of lemon was more strongly felt than fresh feeling. |
| Present invention product 12-6 | Orange-basic beverage | | 1 ppb | 2.1 | Fresh feeling was slightly enhanced. |
| Present invention product 12-7 | | | 10 ppb | 2.7 | Fresh feeling of orange was somewhat strongly felt. |
| Present invention product 12-8 | | | 100 ppb | 3.3 | Fresh feeling of orange was strongly felt. |
| Present invention product 12-9 | | | 1 ppm | 3.5 | Fresh feeling and peel feeling of orange were strongly felt. |
| Present invention product 12-10 | | | 10 ppm | 2.0 | Peel feeling of orange was more strongly felt than fresh feeling. |
| Present invention product 12-11 | Tea with lemon | | 1 ppb | 2.1 | Invigorating feeling of lemon was slightly enhanced. |
| Present invention product 12-12 | | | 10 ppb | 2.7 | Invigorating feeling of lemon was enhanced. |
| Present invention product 12-13 | | | 100 ppb | 3.3 | Invigorating feeling and fresh feeling of lemon were enhanced. |
| Present invention product 12-14 | | | 1 ppm | 3.5 | Invigorating feeling and fresh feeling of lemon were enhanced, and peel feeling was imparted. |
| Present invention product 12-15 | | | 10 ppm | 2.0 | Peel feeling of lemon was more strongly felt than invigorating feeling. |
| Comparative product 12-1 | Lemon-basic beverage | 4,8-Dimethyl-nona-3,7-dien-2-one | 1 ppm | — | Strangeness was felt due to floral and cosmetic senses. |
| Comparative product 12-2 | Orange-basic beverage | | 1 ppm | — | Strangeness was felt due to floral and cosmetic senses. |
| Comparative product 12-3 | Tea with lemon | | 1 ppm | — | Strangeness was felt due to floral and cosmetic senses. |

As shown in Table 17, the present invention product 1-1 including the present compound was confirmed to impart a fresh feeling and a peel feeling to the lemon-taste beverage and improve a flavor of the lemon-taste beverage. As shown in Table 17, it was demonstrated that the present compound does not have the same problem as 4,8-dimethylnona-3,7-dien-2-one, which imparts an extraneous floral aroma and that the present compound is useful as the citral-alternative compound to replace 4,8-dimethylnona-3,7-dien-2-one (the same was confirmed in the following Examples 12-2 and 12-3).

<Example 12-2> Orange-Taste Beverage

The present invention product 1-1 was diluted with ethanol, if necessary, to prepare a flavor-imparting composition, and this flavor-imparting composition was added to a commercially available beverage with 20% orange juice (hereinafter, referred to as orange-basic beverage). Each of the orange-taste beverages of the present invention products 12-6 to 12-10 was prepared by adding the flavor-imparting composition so that a concentration of the present compound in the orange-basic beverage was the concentration shown in Table 17. To the orange-basic beverage, 4,8-dimethylnona-3,7-dien-2-one was added so that a concentration thereof was the concentration shown in Table 17 to prepare an orange-taste beverage of the comparative product 12-2.

On the obtained orange-taste beverages of the present invention products 12-6 to 12-10 and the comparative product 12-2, organoleptic evaluation was performed by 15 well-trained panelists (10 years or more of experience). The organoleptic evaluation was performed by comparing each of the above orange-taste beverages with the orange-basic beverage to which neither the present invention product 1-1 nor 4,8-dimethylnona-3,7-dien-2-one was added as the control product. Specifically, the organoleptic evaluation was performed by commenting on a difference in flavors by the panelists with comparing each of the present invention products 12-6 to 12-10 and the comparative product 12-2 with the control product, and averaging values on the natural feeling scored by the panelists in accordance with the evaluation criteria in Example 4.

The results of the organoleptic evaluation are shown in Table 17. As shown in Table 17, the present invention product 1-1 including the present compound was confirmed to impart a fresh feeling and a peel feeling to the orange-taste beverage and improve a flavor of the orange-taste beverage.

<Example 12-3> Favorite Beverage (Tea with Lemon)

The present invention product 1-1 was diluted with ethanol, if necessary, to prepare a flavor-imparting composition, and this flavor-imparting composition was added to a commercially available tea with lemon (black tea with lemon juice). Each of the favorite beverages of the present invention products 12-11 to 12-15 was prepared by adding the flavor-imparting composition so that a concentration of the present compound in the tea with lemon was the concentration shown in Table 17. To the commercially available tea with lemon, 4,8-dimethylnona-3,7-dien-2-one was added so that a concentration thereof was a concentration shown in Table 17 to prepare a tea with lemon of the comparative product 12-3.

On the obtained tea with lemon of the present invention products 12-11 to 12-15 and the comparative product 12-3, organoleptic evaluation was performed by 15 well-trained panelists (10 years or more of experience). The organoleptic evaluation was performed by comparing each of the above tea with lemon with the commercially available tea with lemon to which neither the present invention product 1-1 nor 4,8-dimethylnona-3,7-dien-2-one was added as the control product. Specifically, the organoleptic evaluation was performed by commenting on a difference in flavors by the panelists with comparing each of the present invention products 12-11 to 12-15 and the comparative product 12-3 with the control product, and averaging values on the natural feeling scored by the panelists in accordance with the evaluation criteria in Example 4.

The results of the organoleptic evaluation are shown in Table 17. As shown in Table 17, the present invention product 1-1 including the present compound was confirmed to impart an invigorating feeling and fresh feeling of lemons to the tea with lemon and improve a flavor of the tea with lemon.

[Example 13] Effect of Addition to Foods and Beverages (Citrus-Taste Food)

<Example 13-1> Lime Sherbet

A lime sherbet (base) was prepared in accordance with the formulation in Table 18. Table 18 also shows the formulation of the following Example 13-2.

TABLE 18

| Component name | Added amount (parts by mass) |
|---|---|
| (Formulation 8) Lime sherbet (control product) | |
| Sugar | 100 |
| Millet jelly | 60 |
| Fructose glucose syrup (75%) | 50 |
| Citric acid (crystal) | 1 |
| 1/5 Lime juice | 100 |
| Water | 689 |
| Total | 1000 |
| (Formulation 9) Yuzu jelly (control product) | |
| Granulated sugar | 600.0 |
| Sorbitol | 120.0 |
| 1/5 Yuzu juice | 50.0 |
| Agar | 10.0 |
| Citric acid (crystal) | 3.0 |
| Colorant | 0.3 |
| Water | 216.7 |
| Total | 1000.0 |

A flavor-imparting composition was prepared by using the present invention product 1-1, and this flavor-imparting composition was added to the above lime sherbet (base). The lime sherbet of the present invention product 13-1 was prepared by adding the flavor-imparting composition so that a concentration of the present compound in the lime sherbet (base) was the concentration shown in Table 19. On the obtained lime sherbet of the present invention product 13-1, organoleptic evaluation was performed by 5 well-trained panelists (10 years or more of experience). The organoleptic evaluation was performed by commenting on a difference in flavors by the panelists with comparing the present invention product 13-1 with the lime sherbet (base) to which the present invention product 1-1 was not added as the control product.

The results of the organoleptic evaluation are shown in Table 19. Table 19 also shows the results of the organoleptic evaluation of the following Example 13-2.

TABLE 19

| | Adding target | Compound added | Concentration | Comment |
|---|---|---|---|---|
| Present invention product 13-1 | Lime sherbet | 8-Methyl-4-methylenenona-7-en-2-one | 100 ppb | Citrus sense was emphasized, and invigorating feeling was enhanced. |
| Present invention product 13-2 | Yuzu jelly | | 100 ppb | Fresh feeling was enhanced, and peel feeling was imparted. |

As shown in Table 19, the present invention product 1-1 including the present compound was confirmed to impart an invigorating feeling to the lime sherbet and improve a flavor (tasty feeling) of the lime sherbet.

<Example 13-2> Yuzu Jelly

A yuzu jelly (base) was prepared in accordance with the formulation in Table 18. A flavor-imparting composition was prepared by using the present invention product 1-1, and this flavor-imparting composition was added to the above yuzu jelly (base). The yuzu jelly of the present invention product 13-2 was prepared by adding the flavor-imparting composition so that a concentration of the present compound in the yuzu jelly (base) was the concentration shown in Table 19. On the obtained yuzu jelly of the present invention product 13-2, organoleptic evaluation was performed by 5 well-trained panelists (10 years or more of experience). The organoleptic evaluation was performed by commenting on a difference in flavors by the panelists with comparing the present invention product 13-2 with the yuzu jelly (base) to which the present invention product 1-1 was not added as the control product.

The results of the organoleptic evaluation are shown in Table 19. As shown in Table 19, the present invention product 1-1 including the present compound was confirmed to impart a fresh feeling to the yuzu jelly and improve a flavor (tasty feeling) of the yuzu jelly.

[Example 14] Effect of Addition to Foods and Beverages (Other Foods)

<Example 14-1> Yoghurt

The present invention product 1-1 was added to a commercially available yoghurt (plain yoghurt) so that the concentration was a concentration shown in Table 20 to prepare a yoghurt of the present invention product 14-1. On the obtained yoghurt of the present invention product 14-1, organoleptic evaluation was performed by 5 well-trained panelists (10 years or more of experience). The organoleptic evaluation was performed by commenting on a difference in flavors by the panelists with comparing the present invention product 14-1 with the commercially available yoghurt to which the present invention product 1-1 was not added as the control product.

The results of the organoleptic evaluation are shown in Table 20. Table 20 also shows the results of the organoleptic evaluation of the following Example 14-2.

TABLE 20

| | Adding target | Compound added | Concentration | Comment |
|---|---|---|---|---|
| Present invention product 14-1 | Yoghurt | 8-Methyl-4-methylenenona-7-en-2-one | 100 ppb | Citrus feeling was imparted to obtain freshness feeling. |
| Present invention product 14-2 | Tubed ginger | | 100 ppb | Invigorating feeling and fresh feeling of ginger were emphasized. |

As shown in Table 20, the present invention product 1-1 including the present compound was confirmed to impart a citrus feeling and a freshness feeling to the yoghurt and improve a flavor (tasty feeling) of the yoghurt.

<Example 14-2> Ginger Paste (Tubed Ginger)

A flavor-imparting composition was prepared by using the present invention product 1-1, and this flavor-imparting composition was added to a commercially available ginger paste (hereinafter, referred to as a tubed ginger). The tubed ginger of the present invention product 14-2 was prepared by adding the flavor-imparting composition so that a concentration of the present compound in the tubed ginger was the concentration shown in Table 20. On the obtained tubed ginger of the present invention product 14-2, organoleptic evaluation was performed by 5 well-trained panelists (10 years or more of experience). The organoleptic evaluation was performed by commenting on a difference in flavors by the panelists with comparing the present invention product 14-2 with the commercially available tubed ginger to which the present invention product 1-1 was not added as the control product.

The results of the organoleptic evaluation are shown in Table 20. As shown in Table 20, the present invention product 1-1 including the present compound was confirmed to impart an invigorating feeling and a fresh feeling to the tubed ginger and improve a flavor (tasty feeling) of the tubed ginger.

[Example 15] Effect of Addition to Perfumery and Cosmetics

<Example 15-1> Gas Range Cleaner (Detergent)

A gas range cleaner (base) was prepared in accordance with the formulation in Table 21. Table 21 also shows the formulation of the mouth-washing liquid of the following Example 15-2.

TABLE 21

| Component name | Added amount (parts by mass) |
|---|---|
| (Formulation 10) Gas range cleaner (control product) | |
| Butylcellosolve | 50.0 |
| Dodecyl polyoxyethylene ether | 20.0 |
| Monoethanolamine | 40.0 |
| Water | 890.0 |
| Total | 1000.0 |
| (Formulation 11) Mouth-washing liquid (control product) | |
| Purified glycerin | 100.0 |
| Polyoxyethylene 60 hydrogenated castor oil | 10.0 |
| Sodium benzoate | 0.5 |
| Saccharin sodium | 0.1 |
| Water | 840.0 |
| Ethanol (95%) | 49.4 |
| Total | 1000.0 |

A flavor-imparting composition was prepared by using the present invention product 1-1, and this flavor-imparting composition was added to the above gas range cleaner (base). The gas range cleaner of the present invention product 15-1 was prepared by adding the flavor-imparting composition so that a concentration of the present compound in the gas range cleaner (base) was the concentration shown in Table 22. On the obtained gas range cleaner of the present invention product 15-1, organoleptic evaluation was performed by 5 well-trained panelists (10 years or more of experience). The organoleptic evaluation was performed by commenting on a difference in aromas when using the gas range cleaner by the panelists with comparing the present invention product 15-1 with the gas range cleaner (base) to which the present invention product 1-1 was not added as the control product.

The results of the organoleptic evaluation are shown in Table 22. Table 22 also shows the results of the organoleptic evaluation of the following Example 15-2.

TABLE 22

| Adding target | Compound added | Concentration | Comment |
|---|---|---|---|
| Present invention product 15-1 | Gas range cleaner | 8-Methyl-4-methylenenona-7-en-2-one | 100 ppb | Citrus-like invigorating feeling was felt. |
| Present invention product 15-2 | Mouth-washing liquid | | 100 ppb | Citrus-like fresh scent reached the nose and was comfortable. |

As shown in Table 22, the present invention product 1-1 including the present compound was confirmed to impart a citrus-like invigorating feeling to the gas range cleaner and improve the aroma of the gas range cleaner.

<Example 15-2> Mouth-Washing Liquid

A mouth-washing liquid (base) was prepared in accordance with the formulation in Table 21. A flavor-imparting composition was prepared by using the present invention product 1-1, and this flavor-imparting composition was added to the above mouth-washing liquid (base). The mouth-washing liquid of the present invention product 15-2 was prepared by adding the flavor-imparting composition so that a concentration of the present compound in the mouth-washing liquid (base) was the concentration shown in Table 22. On the obtained mouth-washing liquid of the present invention product 15-2, organoleptic evaluation was performed by 5 well-trained panelists (10 years or more of experience). The organoleptic evaluation was performed by the following evaluation of difference in flavors with comparing the present invention product 15-2 with the mouth-washing liquid (base) to which the present invention product 1-1 was not added as the control product. Specifically, the organoleptic evaluation was performed by summarily commenting by the panelists on evaluation of flavors when the panelists kept each mouth-washing liquid in their mouths and evaluation of flavors when the panelists spat each mouth-washing liquid after keeping in their mouths for approximately 1 minute.

The results of the organoleptic evaluation are shown in Table 22. As shown in Table 22, the present invention product 1-1 including the present compound was confirmed to impart a citrus-like fresh scent (top-note) to the mouth-washing liquid and improve the flavor of the mouth-washing liquid.

<Example 15-3> Kitchen Detergent

A flavor-imparting composition was prepared by using the present invention product 1-1, and this flavor-imparting composition was added to each of commercially available kitchen detergents having orange, berry, rose or peach-note. Each of the kitchen detergents of the present invention products 15-3 to 15-6 was prepared by adding the flavor-imparting composition so that a concentration of the present compound in the kitchen detergent was the concentration shown in Table 23. On the obtained kitchen detergents of the present invention products 15-3 to 15-6, organoleptic evaluation was performed by 5 well-trained panelists (10 years or more of experience). The organoleptic evaluation was performed by commenting on a difference in aromas by the panelists with comparing each of the present invention products 15-3 to 15-6 with each of the above kitchen detergents to which the present invention product was not added as the control product.

The results of the organoleptic evaluation are shown in Table 23.

TABLE 23

| Compound added | Note | Concentration | Comment |
|---|---|---|---|
| Present invention product 15-3 | 8-Methyl-4-methylenenona-7-en-2-one | Orange-note | 100 ppm | Orange-like peel feeling and an invigorating feeling were felt. |
| Present invention product 15-4 | | Berry-note | | Strawberry-like fresh feeling was felt. |
| Present invention product 15-5 | | Rose-note | | Characteristic refreshing scent of fresh rose flower was felt. |
| Present invention product 15-6 | | Peach-note | | Peach-like fresh scent was felt. |

As shown in Table 23, the present invention product 1-1 including the present compound was confirmed to be useful for improving the aroma of the detergents having citrus, fruit or floral note.

The invention claimed is:

1. A flavor-imparting composition comprising a compound represented by the following formula (1):

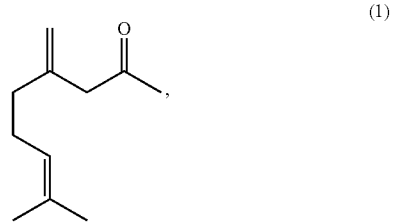

wherein a content of the compound is 100 mass ppb to 10 mass % relative to a total mass of the flavor-imparting composition.

2. The flavor-imparting composition according to claim 1, further comprising at least one selected from the group consisting of a solvent, an aroma-retaining agent and another aroma compound.

3. A consumer product comprising a compound represented by the following formula (1):

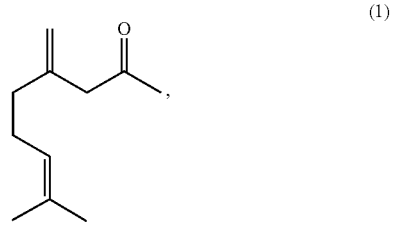

wherein the consumer product is any selected from the group consisting of a food, a beverage, perfumery and cosmetics.

4. A consumer product comprising a compound represented by the following formula (1):

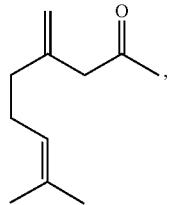
(1)

wherein the consumer product is a food or a beverage, and wherein a content of the compound is 1 mass ppb to 100 mass ppm relative to a total mass of the food or the beverage.

5. A consumer product comprising a compound represented by the following formula (1):

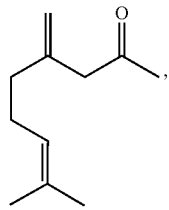
(1)

wherein the consumer product is a perfumery or a cosmetics, and wherein a content of the compound is 1 mass ppb to 0.1 mass % relative to a total mass of the perfumery or the cosmetics.

6. A method of imparting a flavor to a flavor-imparting composition, comprising adding a compound to a flavor-imparting composition,
wherein the compound is represented by the following formula (1):

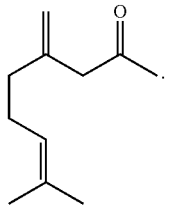
(1)

7. A method of imparting a flavor to a consumer product, comprising adding a compound to a consumer product,
wherein the compound is represented by the following formula (1):

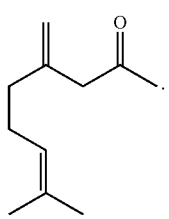
(1)

8. The method of imparting a flavor to a consumer product according to claim 7, wherein the consumer product is any selected from the group consisting of a food, a beverage, perfumery and cosmetics.

* * * * *